(12) United States Patent
Geng et al.

(10) Patent No.: US 10,798,472 B2
(45) Date of Patent: Oct. 6, 2020

(54) DATA TRANSMISSION METHOD, DATA RECEIVING METHOD, OPTICAL LINE TERMINAL AND OPTICAL NETWORK UNIT

(71) Applicant: ZTE CORPORATION, Shenzhen (CN)

(72) Inventors: Dan Geng, Shenzhen (CN); Weiliang Zhang, Shenzhen (CN); Liquan Yuan, Shenzhen (CN); Zhuang Ma, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/347,767

(22) PCT Filed: Oct. 23, 2017

(86) PCT No.: PCT/CN2017/107268
§ 371 (c)(1),
(2) Date: Jun. 28, 2019

(87) PCT Pub. No.: WO2018/082461
PCT Pub. Date: May 11, 2018

(65) Prior Publication Data
US 2019/0313169 A1 Oct. 10, 2019

(30) Foreign Application Priority Data
Nov. 7, 2016 (CN) .......................... 2016 1 0975449

(51) Int. Cl.
*H04J 14/08* (2006.01)
*H04Q 11/00* (2006.01)
(Continued)

(52) U.S. Cl.
CPC .......... *H04Q 11/0067* (2013.01); *H04J 14/00* (2013.01); *H04J 14/02* (2013.01); *H04Q 11/00* (2013.01)

(58) Field of Classification Search
CPC ............... H04Q 11/0067; H04Q 11/00; H04Q 2011/0033; H04Q 11/04;
(Continued)

(56) References Cited

U.S. PATENT DOCUMENTS 5,572,349 A * 11/1996 Hale ...................... H04J 3/1694
348/E7.07
6,970,648 B2 * 11/2005 Ofek .................... H04L 12/6418
398/47
(Continued)

FOREIGN PATENT DOCUMENTS

CN 1484898 A 3/2004
CN 102056031 A 5/2011
(Continued)

OTHER PUBLICATIONS

International Search Report dated Jan. 22, 2018 for International Application No. PCT/CN2017/107268, 7 pages.
(Continued)

*Primary Examiner* — Hibret A Woldekidan
(74) *Attorney, Agent, or Firm* — Knobbe, Martens, Olson & Bear, LLP

(57) ABSTRACT

A data transmission and reception method and device are provided. The data transmission method includes: determining wavelength channels for data to be transmitted according to received wavelength channel information of an optical network unit (ONU); dividing the data to be transmitted in a sequence according to the number of the wavelength channels to obtain data packets; identifying the data packets according to the division sequence to obtain sequence identifiers of the data packets; and encapsulating the data packets into downstream frames of the wavelength channels in a one-to-one correspondence according to the sequence iden-
(Continued)

tifiers of the data packets, and transmitting the downstream frames of the wavelength channels separately to the ONU.

16 Claims, 5 Drawing Sheets

(51) Int. Cl.
 *H04J 14/02* (2006.01)
 *H04J 14/00* (2006.01)
(58) Field of Classification Search
 CPC .. H04Q 2011/0064; H04J 14/00; H04J 14/02; H04J 14/0245; H04J 14/0258; H04J 14/0267; H04J 14/08; H04J 3/1694; H04J 14/0216; H04J 3/00; H04J 14/0232; H04J 14/0238; H04J 14/0282; H04B 10/272
 USPC ....... 398/68–75, 79, 98–100, 34, 35, 47, 67, 398/58, 66
 See application file for complete search history.

(56) References Cited

U.S. PATENT DOCUMENTS

| | | | |
|---|---|---|---|
| 7,031,343 B1 | 4/2006 | Kuo et al. | |
| 7,054,558 B2* | 5/2006 | De Girolamo | H04J 14/0283 370/222 |
| 8,565,610 B2* | 10/2013 | Sprague | H04Q 11/0062 398/158 |
| 8,611,745 B2* | 12/2013 | Kashima | H04H 20/69 398/67 |
| 8,630,546 B2* | 1/2014 | Bernard | H04J 3/0647 398/154 |
| 8,824,498 B2 | 9/2014 | Chen et al. | |
| 9,319,139 B2* | 4/2016 | Effenberger | H04B 10/2581 |
| 9,438,368 B2 | 9/2016 | Gao et al. | |
| 9,667,377 B2 | 5/2017 | Luo et al. | |
| 10,306,666 B2* | 5/2019 | Zhu | H04W 72/1268 |
| 10,659,185 B2* | 5/2020 | Zhang | H04B 10/27 |
| 2010/0322150 A1* | 12/2010 | Wilcoxson | H04B 7/18508 370/321 |
| 2012/0224858 A1* | 9/2012 | Chen | H04Q 11/0067 398/98 |
| 2012/0251106 A1* | 10/2012 | Valiveti | H04L 47/34 398/45 |
| 2013/0094861 A1* | 4/2013 | Luo | H04J 14/0241 398/68 |
| 2013/0315589 A1* | 11/2013 | Gao | H04J 14/0282 398/48 |
| 2015/0055956 A1* | 2/2015 | Lee | H04B 10/272 398/79 |
| 2015/0125149 A1 | 5/2015 | Gao et al. | |
| 2016/0359580 A1 | 12/2016 | Gao et al. | |
| 2017/0250774 A1 | 8/2017 | Luo | |

FOREIGN PATENT DOCUMENTS

| | | |
|---|---|---|
| CN | 103430572 A | 12/2013 |
| CN | 106059704 A | 10/2016 |
| WO | 2013/173983 A1 | 11/2013 |
| WO | 2014008659 A1 | 1/2014 |

OTHER PUBLICATIONS

Written Opinion of the International Searching Authority dated Jan. 22, 2018 for International Application No. PCT/CN2017/107268, 3 pages.
Office Action of corresponding Chinese Patent Application No. 201610975449.9—5 pages (dated May 27, 2020).

* cited by examiner

DATA TRANSMISSION METHOD, DATA RECEIVING METHOD, OPTICAL LINE TERMINAL AND OPTICAL NETWORK UNIT

CROSS REFERENCE TO RELATED APPLICATIONS

This is a U.S. National Stage Application, filed under 35 U.S.C. 371, of International Patent Application No. PCT/CN2017/107268, filed on Oct. 23, 2017, which claims priority to Chinese patent application No. 201610975449.9 filed on Nov. 7, 2016, contents of both of which are incorporated herein by reference in their entireties.

TECHNICAL FIELD

Embodiments of the present disclosure relate to the field of optical communications and, in particular, to a data transmission method and device, and a data reception method and device.

BACKGROUND

With the development of network technologies, a large number of services such as voices, data and videos can be transmitted by using a network. Therefore, the demand for bandwidth is constantly increasing, and a passive optical network (PON) system emerges to meet such demand.

FIG. 1 is a schematic diagram of a topology of a PON system. As shown in FIG. 1, the PON system is generally composed of an optical line terminal (OLT) on the office side, optical network units (ONUs) on the user side, and an optical distribution network (ODN). The PON system generally has a point-to-multipoint network structure. The ODN is composed of single-mode fibers and passive optical devices such as an optical splitter, an optical connector, and the like. The ODN provides an optical transmission medium for physical connection between the OLT and the ONUs. To improve the line rate with saving optical fiber resources, it is proposed that multiple wavelengths in one optical fiber are simultaneously used for data transmission, and downstream data transmissions of different ONUs on the same wavelength are implemented in the time-division-multiplexing mode and upstream data transmissions of different ONUs on the same wavelength are implemented in the time-division-multiplexing access mode. This is referred to as a wavelength-division time-division PON system. FIG. 2 is a schematic diagram of another topology of the PON system. As shown in FIG. 2, each OLT manages multiple groups of ONUs in a wavelength division multiplexing mode. A group of ONUs on the same upstream wavelength and downstream wavelength transmit upstream data on the same upstream wavelength and receive downstream data on the same downstream wavelength. ONU groups on different upstream wavelengths or downstream wavelengths transmit upstream data on different upstream wavelengths and receive downstream data on different downstream wavelengths.

To enable the ONU to transmit data at a rate exceeding a single channel rate, it is proposed that the ONU can transmit and receive data on multiple groups of wavelength channels simultaneously. In this architecture, it is urgent to solve the problem of how an OLT transmits data to an ONU over multiple wavelength channels and how the ONU combines data packets in a sequence in which the OLT transmits the data packets. Proposed in the existing art is a method in which an OLT can transmit data packets on multiple channels in a time sequence, and an ONU receives data on the multiple channels and then combines the data packets in a time sequence in which the data is received. This requires that the multiple channels over which the OLT transmits data are strictly time-synchronized. If delay jitter or the like exists in data transmission, the sequence in which the ONU receives the data is inconsistent with the sequence in which the OLT transmits the data, making the data received by the ONU out of order. To avoid data disorder, the time interval between data transmissions on different channels may be increased. However, this artificially increases a data transmission delay and reduces the data transmission efficiency. In this way, in the existing art, a data disorder occurs when the OLT transmits data to the ONU on the multiple channels.

SUMMARY

In view of this, embodiments of the present disclosure are intended to provide a data transmission method and device and a data reception method and device that enable an OLT to transmit data on a plurality of channels while avoiding a disorder of data received by an ONU, thus improving user experience.

To achieve the preceding objective, solutions provided in embodiments of the present disclosure are implemented as follows.

According to a first aspect, a data transmission method is provided in an embodiment of the present disclosure. The data transmission method includes: determining wavelength channels for data to be transmitted according to received wavelength channel information of an optical network unit (ONU); dividing the data to be transmitted in a sequence according to the number of the wavelength channels to obtain data packets; identifying the data packets according to the division sequence to obtain sequence identifiers of the data packets; and encapsulating the data packets into downstream frames of the wavelength channels in a one-to-one correspondence according to the sequence identifiers of the data packets, and transmitting the downstream frames of the wavelength channels separately to the ONU.

Further, encapsulating the data packets in the downstream frames of the wavelength channels in a one-to-one correspondence according to the sequence identifiers of the data packets includes: determining a wavelength channel identifier corresponding to each of the data packets according to the sequence identifier of each of the data packets; and encapsulating each of the data packets in the downstream frame of the wavelength channel corresponding to the wavelength channel identifier. The downstream frames in which the data packets are encapsulated have a same superframe number so that the ONU is capable of combining the data packets in the downstream frames having the same superframe number and a same ONU identifier on the wavelength channels.

Further, before determining the wavelength channel identifier corresponding to each of the data packets according to the sequence identifier of each of the data packets, the method further includes: inserting a superframe number in the downstream frames of the wavelength channels if the downstream frames of the wavelength channels have no superframe number.

Further, encapsulating the data packets in the downstream frames of the wavelength channels in a one-to-one correspondence according to the sequence identifiers of the data packets includes: writing the sequence identifier of each of the data packets into a frame header of the downstream frame of the wavelength channel corresponding to the data packet.

Further, before determining the wavelength channels of the data to be transmitted according to the received wavelength channel information of the ONU, the method further includes: receiving the wavelength channel information from the ONU; determining, from the wavelength channel information, information about wavelength channels that are allowed to operate and transmitting the information about the wavelength channels that are allowed to operate to the ONU so that the ONU enables optical modules corresponding to the information about the wavelength channels that are allowed to operate and returns wavelength channel information corresponding to the enabled optical modules; and determining the wavelength channels for the data to be transmitted according to the wavelength channel information corresponding to the enabled optical modules.

According to a second aspect, a data reception method is provided in an embodiment of the present disclosure. The data reception method includes: receiving downstream frames of wavelength channels; determining sequence identifiers of data packets according to the downstream frames of the wavelength channels; and combining the data packets in the downstream frames of the wavelength channels according to the sequence identifiers of the data packets to obtain received data.

Further, determining the sequence identifiers of the data packets according to the downstream frames of the wavelength channels includes: determining the sequence identifiers of the data packets in the downstream frames of the wavelength channels according to a sequence of identifiers of the wavelength channels. Correspondingly, combining the data packets in the downstream frames of the wavelength channels according to the sequence identifiers of the data packets to obtain received data includes: combining the data packets in the downstream frames having a same superframe number and a same ONU identifier on the wavelength channels according to the sequence identifiers of the data packets to obtain the received data.

Further, a frame header of the downstream frame of each of the wavelength channels include the sequence identifier of the data packet in the downstream frame of the wavelength channel.

Further, before receiving the downstream frames of the wavelength channels, the method further includes: transmitting wavelength channel information of an optical network unit (ONU) to an optical line terminal (OLT) so that the OLT determines information about wavelength channels that are allowed to operate; receiving the information about the wavelength channels that are allowed to operate returned by the OLT; and enabling optical modules corresponding to the information about the wavelength channels that are allowed to operate, determining wavelength channel information corresponding to the enabled optical modules, and transmitting the wavelength channel information corresponding to the enabled optical modules to the OLT so that the OLT determines the wavelength channels for data to be transmitted according to the wavelength channel information corresponding to the enabled optical modules.

According to a third aspect, a data transmission device is provided in an embodiment of the present disclosure. The data transmission device includes: a first determining module, which is configured to determine wavelength channels for data to be transmitted according to received wavelength channel information of an optical network unit (ONU); a dividing module, which is configured to divide the data to be transmitted in a sequence according to the number of the wavelength channels to obtain data packets; an identifying module, which is configured to identify the data packets according to the division sequence to obtain sequence identifiers of the data packets; and a transmitting module, which is configured to encapsulate the data packets in downstream frames of the wavelength channels in a one-to-one correspondence according to the sequence identifiers of the data packets, and to transmit the downstream frames of the wavelength channels separately to the ONU.

Further, the transmitting module is specifically configured to determine a wavelength channel identifier corresponding to each data packet according to the sequence identifier of each data packet; and to encapsulate each data packet into the downstream frame of the wavelength channel corresponding to the wavelength channel identifier, where the downstream frames in which the data packets are encapsulated have a same superframe number so that the ONU is capable of combining the data packets in the downstream frames having the same superframe number and a same ONU identifier on the wavelength channels.

Further, the device further includes: an inserting module, which is configured to, before the wavelength channel identifiers corresponding to the data packets are determined according to the sequence identifiers of the data packets, insert a superframe number in the downstream frames of the wavelength channels if the downstream frames of the wavelength channels have no superframe number.

Further, the transmitting module is specifically configured to write the sequence identifier of each of the data packets into a frame header of the downstream frame of the wavelength channel corresponding to the data packet.

Further, the first determining module is specifically configured to receive the wavelength channel information of the ONU; to determine, from the wavelength channel information, information about wavelength channels that are allowed to operate and transmit the information about the wavelength channels that are allowed to operate to the ONU so that the ONU enables optical modules corresponding to the information about the wavelength channels that are allowed to operate and returns wavelength channel information corresponding to the enabled optical modules; and to determine the wavelength channels for the data to be transmitted according to the wavelength channel information corresponding to the enabled optical modules.

According to a fourth aspect, a data reception device is provided in an embodiment of the present disclosure. The data reception device includes: a receiving module, which is configured to receive downstream frames over wavelength channels; a second determining module, which is configured to determine sequence identifiers of data packets according to the downstream frames over the wavelength channels; and a packet combining module, which is configured to combine the data packets in the downstream frames over the wavelength channels according to the sequence identifiers of the data packets to obtain received data.

Further, the second determining module is specifically configured to determine the sequence identifiers of the data packets in the downstream frames of the wavelength channels according to a sequence of identifiers of the wavelength channels; and correspondingly, the packet combining module is specifically configured to combine the data packets in the downstream frames having a same superframe number and a same ONU identifier on the wavelength channels according to the sequence identifiers of the data packets to obtain the received data.

Further, a frame header of the downstream frame of each wavelength channel include the sequence identifier of the data packet in the downstream frame of the wavelength channel.

Further, the device further includes: a processing module, which is configured to, before the downstream frames of the wavelength channels are received, transmit wavelength channel information of an optical network unit (ONU) to an optical line terminal (OLT) so that the OLT determines information about wavelength channels that are allowed to operate; receive the information about the wavelength channels that are allowed to operate returned by the OLT; and enable optical modules corresponding to the information about the wavelength channels that are allowed to operate, determine wavelength channel information corresponding to the enabled optical modules, and transmit the wavelength channel information corresponding to the enabled optical modules to the OLT so that the OLT determines the wavelength channels for the data to be transmitted according to the wavelength channel information corresponding to the enabled optical modules.

According to a data transmission method and device and a data reception method and device provided in embodiments of the present disclosure, wavelength channels for the data to be transmitted are determined according to received wavelength channel information of an optical network unit (ONU); the data to be transmitted is divided into data packets in a sequence according to the number of the wavelength channels where the number of the data packets is the same as the number of the wavelength channels; the data packets are identified to obtain sequence identifiers of the data packets; the data packets are encapsulated into downstream frames of the wavelength channels in a one-to-one correspondence according to the sequence identifiers of the data packets; and the downstream frames of the wavelength channels are transmitted to the ONU separately. In this way, each of the data packets is encapsulated into a respective one of the downstream frames of the wavelength channels according to its sequence identifier. That is, the sequence identifier of each data packet is also encapsulated when the OLT encapsulates the data packets. Therefore, after receiving the data packets, the ONU can combine the data packets according to the sequence identifiers of the data packets, thereby enabling the OLT to transmit data on a plurality of channels while avoiding a disorder of data received by the ONU, thus improving user experience.

DETAILED DESCRIPTION

Technical solutions provided in embodiments of the present disclosure will be described clearly and completely in conjunction with the accompanying drawings in embodiments of the present disclosure.

Figure 1:
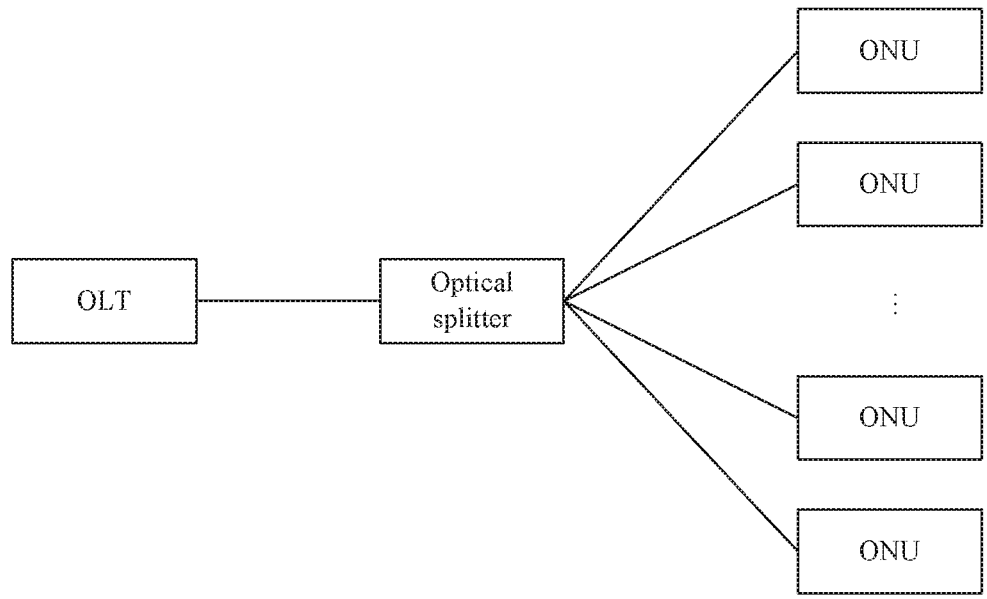
FIG. 1 is a schematic diagram of a topology of a PON system.
Figure 2:
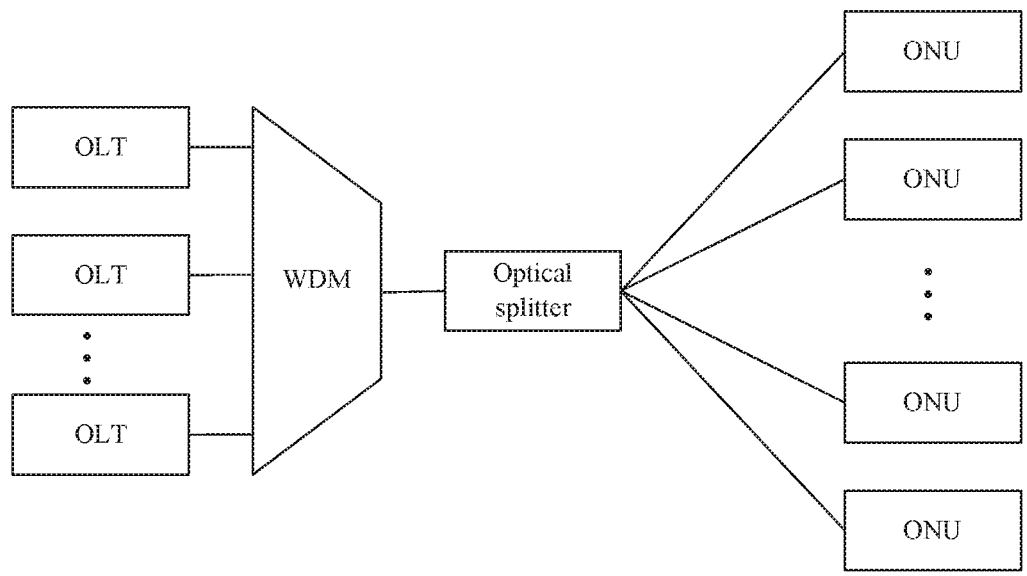
FIG. 2 is a schematic diagram of another topology of the PON system.

A data transmission and reception method is provided in embodiments of the present disclosure. This method is applicable to a PON system as shown in FIG. 2. In FIG. 2, an OLT includes multiple ports. Each port corresponds to one wavelength channel. On each channel, a downstream wavelength and an upstream wavelength are used. On each channel, one port manages a group of ONUs. This group of ONUs transmit upstream data in a time division multiplexing access mode. Different groups of ONUs on different wavelength channels transmit data in a wavelength division multiplexing mode. One ONU can transmit and receive data on multiple wavelength channels simultaneously.

Figure 3:
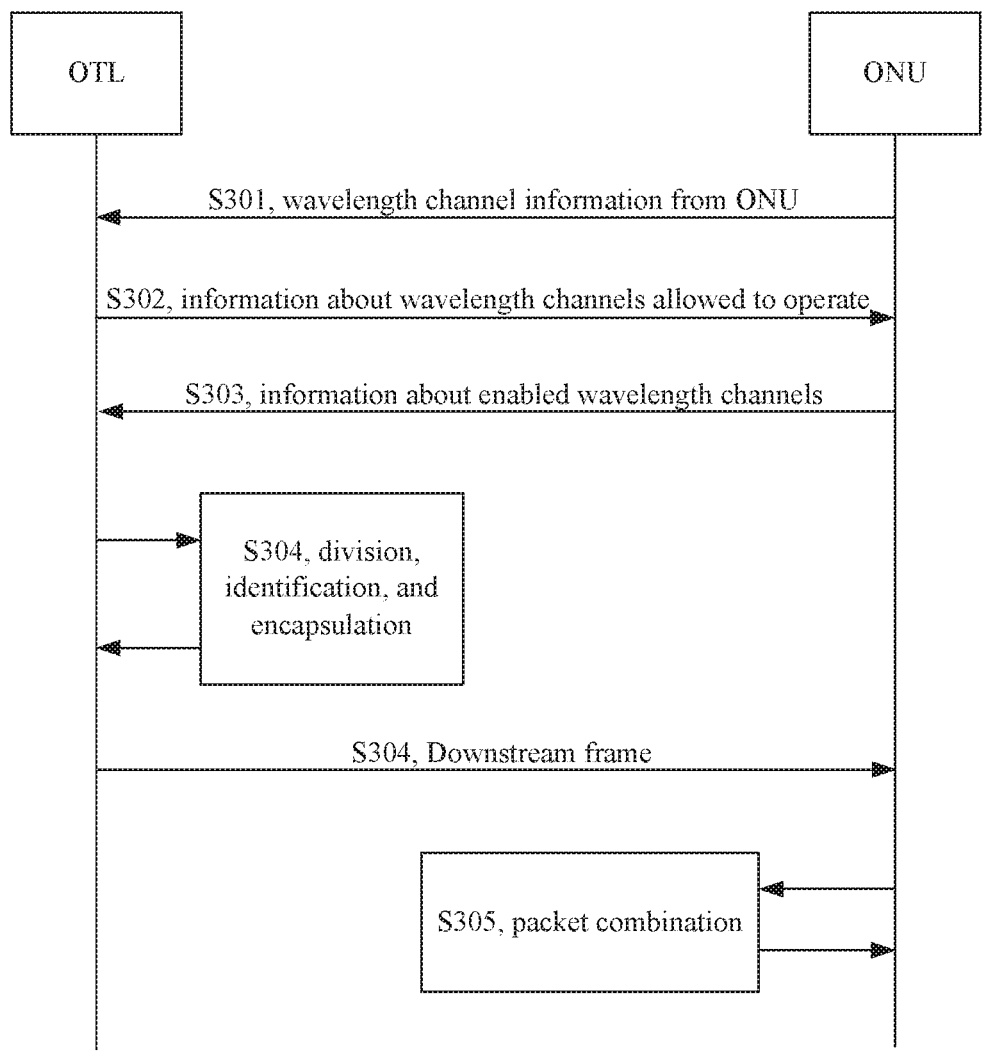
FIG. 3 is a flowchart of a data transmission and reception method according to an embodiment of the present disclosure.

FIG. 3 is a flowchart of the data transmission and reception method according to an embodiment of the present disclosure. As shown in FIG. 3, the data transmission and reception method performed by an OLT and an ONU includes the steps described below.

In step S301, the ONU transmits the wavelength channel information of the ONU to the OLT.

From the above, it can be seen that one ONU supports multiple wavelength channels. The ONU first transmits its own wavelength channel information to the OLT to notify the OLT of information about wavelength channels that the ONU supports. The wavelength channel information includes information about upstream wavelengths and downstream wavelengths that the ONU supports.

In step S302, the OLT determines, from the wavelength channel information of the ONU, information about wavelength channels that are allowed to operate and transmits the information about the wavelength channels that are allowed to operate to the ONU.

After receiving the wavelength channel information of the ONU, the OLT determines, from the wavelength channel information of the ONU, the information about the wavelength channels that are allowed to operate. For example, the number of wavelength channels indicated in the wavelength channel information of the ONU that the OLT receives is 6, the number of wavelength channels in the information determined by the OLT about the wavelength channels that are allowed to operate is 5, and the OLT transmits the information about the wavelength channels that are allowed to operate to the ONU.

In step S303, the ONU enables optical modules corresponding to the information about the wavelength channels that are allowed to operate and sends to the OLT wavelength channel information corresponding to the enabled optical module.

Specifically, after the ONU receives information about wavelength channels that are allowed to operate, the ONU keeps or enables optical module transceivers corresponding to the preceding wavelength channels that are allowed to operate, keeps optical modules corresponding to other wavelength channels in the off state, sends to the OLT wavelength channel information corresponding to the enabled optical modules, and replies to the OLT that the ONU agrees to operate on the wavelength channels corresponding to the enabled optical modules. For example, if the number of wavelength channels indicated by the information determined by the OLT about the wavelength channels that are allowed to operate is 5, and the number of wavelength channels corresponding to the enabled optical modules is only 4, then the OLT determines that the number of wavelength channels for data transmission is 4.

Thus, the OLT determines, according to the received wavelength channel information of the ONU, wavelength channels for the data to be transmitted.

In step S304, the OLT divides, identifies and encapsulates data to be transmitted, and transmits downstream frames to the ONU after the division, identification and encapsulation.

In a specific implementation process, the step S304 may include:

dividing the data to be transmitted in a sequence according to the number of the wavelength channels to obtain the data packets; identifying the data packets according to the division sequence to obtain sequence identifiers of the data packets; and encapsulating the data packets into the downstream frames of the wavelength channels in a one-to-one correspondence according to the sequence identifiers of the data packets, and transmitting the downstream frames of the wavelength channels separately to the ONU.

After the wavelength channels for the data to be transmitted are determined, using four wavelength channels as an example, the data to be transmitted is divided, in a sequence, into four data packets. The four data packets are identified according to the division sequence so that the sequence identifiers of the data packets are obtained. The sequence identifiers may be numbers, letters, symbols or the like. For example, if the sequence identifiers are numbers, then the data packets are identified according to the division sequence so that data packets 1, 2, 3 and 4 are obtained.

To encapsulate the data packets in the downstream frames of the wavelength channels in a one-to-one correspondence for enabling the ONU to combine the data packets in a correct sequence after the ONU receives the downstream frames, in an optional embodiment, the step of encapsulating the data packets in the downstream frames of the wavelength channels a one-to-one correspondence according to the sequence identifiers of the data packets includes: determining a identifier of the wavelength channel corresponding to each data packet according to the sequence identifier of the data packet; and encapsulating each data packet in the downstream frame of the wavelength channel corresponding to the identifier.

The downstream frames in which the data packets are encapsulated have a same superframe number so that the ONU is capable of combining the data packets in the downstream frames having the same superframe number and a same ONU identifier on the wavelength channels.

The identifiers of the wavelength channels may be numbers, letters, symbols or the like for identifying the sequence of the wavelength channels. Both the OTL and the ONU know the wavelength channel identifiers corresponding to the sequence identifiers of the data packets. In this way, when the OLT transmits the data packets to the ONU, the ONU learns the sequence identifiers of the data packets according to the sequence identifiers of the data packets corresponding to the wavelength channel identifiers and combines the data packets according to the sequence.

Here, in an example in which the wavelength channel identifiers are numbers, it is determined that the wavelength channel identifier corresponding to data packet 1 is channel 1 and data packet 1 is encapsulated in the downstream frame of channel 1; the wavelength channel identifier corresponding to data packet 2 is channel 2 and data packet 2 is encapsulated in the downstream frame of channel 2; the wavelength channel identifier corresponding to data packet 3 is channel 3 and data packet 3 is encapsulated in the downstream frame of channel 3; and the wavelength channel identifier corresponding to data packet 4 is channel 4 and data packet 4 is encapsulated in the downstream frame of channel 4.

Figure 4:
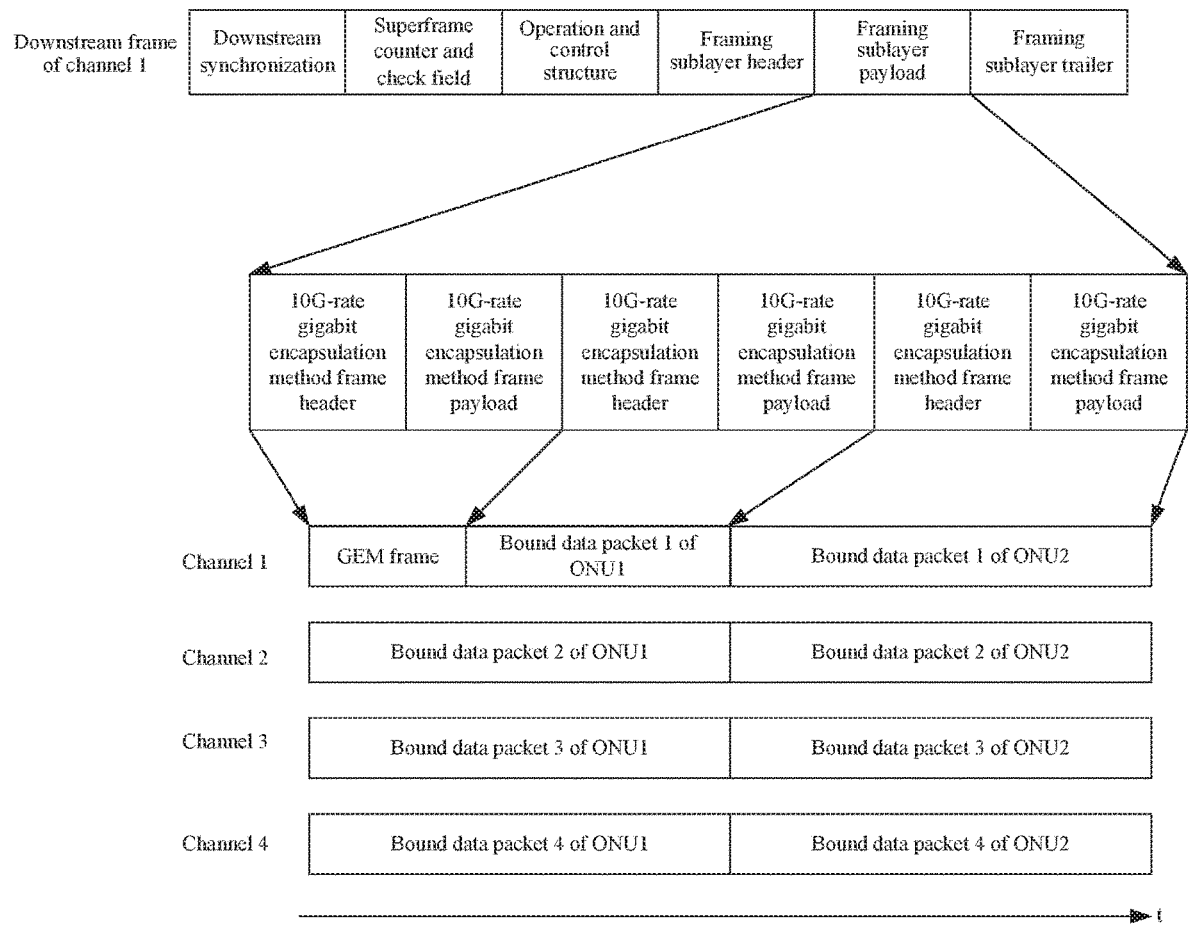
FIG. 4 is a structure diagram of an optional downstream frame according to an embodiment of the present disclosure.

For example, FIG. 4 is a structure diagram of an optional downstream frame according to an embodiment of the present disclosure. As shown in FIG. 4, the downstream frame of channel 1 includes: downstream synchronization, a superframe counter and a check field, an operation and control structure, a framing sublayer frame header, a framing sublayer payload, and a framing sublayer frame trailer. During the encapsulation, the data packet is encapsulated in the framing sublayer payload. Since each channel may be used for data transmission of multiple ONUs, as shown in FIG. 4, the framing sublayer payload includes three GEM frames. Each GEM frame includes a 10G-rate gigabit encapsulation method frame header and a 10G-rate gigabit encapsulation method payload. During specific implementation, each data packet is encapsulated in the 10G-rate gigabit encapsulation method payload of the GEM frame of the framing sublayer payload.

In practical use, after the OLT determines channels 1, 2, 3 and 4, different channels may use the same clock source or different clock sources. When different channels use different clock sources, the downstream frame of each of the different channels is synchronized with the corresponding clock source. In the case of transmitting data to ONU1 and ONU2 by using the downstream frame structure in FIG. 4, multiple downstream frames transmitted simultaneously on different channels carry the same superframe number. The superframe number is carried in the superframe counter in the frame header of the downstream frame and indicates the serial number of this downstream frame. For example, the first downstream frame transmitted by the OLT on the channel 1 is 0. Each time a downstream frame is transmitted, the superframe number in the superframe number counter is increased by 1. The superframe number of the second transmitted downstream frame is 1. The superframe number of the Mth transmitted downstream frame is M−1. When the superframe number reaches the maximum value N of the superframe number counter, the superframe number of the next downstream frame transmitted on channel 1 is counted from 0 again.

The data packet 1 of ONU1 is encapsulated in the second GEM frame of channel 1. The data packet 2 of ONU1 is encapsulated in the first GEM frame of channel 2. The data packet 3 of ONU1 is encapsulated in the first GEM frame of channel 3. The data packet 4 of ONU1 is encapsulated in the first GEM frame of channel 4. The data packet 1 of ONU2 is encapsulated in the third GEM frame of channel 1. The data packet 2 of ONU2 is encapsulated in the second GEM frame of channel 2. The data packet 3 of ONU2 is encapsulated in the second GEM frame of channel 3. The data packet 4 of ONU2 is encapsulated in the second GEM frame of channel 4.

After receiving the downstream frames, the ONU combines data packets in downstream frames having the same superframe number and the same ONU identifier according to the sequence identifiers of the data packets. This prevents a sequence error in the process of packet combination by the ONU or prevents combining the data packet of another ONU.

It is to be noted here that when the OLT divides the data to be transmitted, the sizes of the data packets allocated by the OLT to the channels are configured in such a manner that the transmissions of the data packets on the channels are ended earliest to improve the transmission efficiency between the OLT and the ONU.

If the downstream frame of the wavelength channel does not have the superframe number, in an optional embodiment, before determining the wavelength channel identifiers corresponding to the data packets according to the sequence identifiers of the data packets, the method further include: inserting a superframe number in the downstream frames of the wavelength channels.

Figure 5:
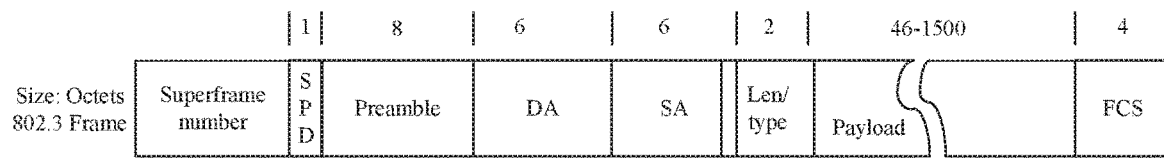
FIG. 5 is a structure diagram of another optional downstream frame according to an embodiment of the present disclosure.

FIG. 5 is a structure diagram of another optional downstream frame according to an embodiment of the present disclosure. As shown in FIG. 5, this downstream frame structure is obtained by inserting a superframe number in an existing Ethernet frame. As shown in FIG. 5, a superframe number is added in front of the start-of-packet delimiter (SPD) of the Ethernet frame. The definition of the superframe number here is the same as the definition of the preceding superframe number and will not be repeated here. After the SPD in the Ethernet frame is preamble. "DA" denotes the destination address. "SA" denotes the source address. "Len" denotes the data length. "Type" denotes the data type. "Payload" denotes payload. "FCS" denotes the check data. When multiple downstream frames transmitted by the OLT to the ONU simultaneously on different channels carry the same superframe number, the OLT divides, according to the channel identifiers, the data to be transmitted to one ONU into one or more data packets and distributes the one or more data packets to one or more channels supported by this ONU. The data packet on each channel is carried in the payload shown in FIG. 5.

In an optional embodiment, encapsulating the data packets in the downstream frames of the wavelength channels in a one-to-one correspondence according to the sequence identifiers of the data packets includes: writing the sequence identifier of each data packet into the frame header of the downstream frame of the wavelength channel corresponding to the data packet.

Specifically, in the process of encapsulating the data packets, in order for enabling the ONU to learn the sequence of the encapsulated data packets, the sequence identifiers of the data packets are written into frame headers of the downstream frames of the wavelength channels corresponding to the data packets. Using the downstream frame structure in FIG. 4 as an example, when it is needed to transmit data to the ONU, the sequence identifiers of the data packets are written into 10G-rate gigabit encapsulation method frame headers of the downstream frames of the wavelength channels corresponding to the data packets and then the downstream frames are transmitted to the ONU. In this way, after receiving the downstream frames, the ONU parses out the sequence identifiers of the data packets and combines the data packets according to the sequence identifiers of the data packets.

In step S305, the ONU combines the received downstream frames on the wavelength channels to obtain received data.

In a specific implementation process, the step S305 may include:

receiving the downstream frames of the wavelength channels; determining sequence identifiers of the data packets according to the downstream frames of the wavelength channels; and combining the data packets in the downstream frames of the wavelength channels according to the sequence identifiers of the data packets to obtain received data.

Here, delay jitter exists in the downstream frames of the wavelength channels. As a result, the reception sequence of the downstream frames of the wavelength channels at the ONU is uncertain. To ensure the correctness of packet combination, the ONU first determines the sequence identifiers of the data packets according to the downstream frames of the wavelength channels and then combines the data packets in the downstream frames of the wavelength channels according to the sequence identifiers of the data packets, thus avoiding incorrect packet combination caused by a disorder of transmitted data.

To determine the sequence identifiers of the data packets to combine the data packets correctly, in an optional embodiment, determining the sequence identifiers of the data packets according to the downstream frames of the wavelength channels includes: determining the sequence identifiers of the data packets in the downstream frames of the wavelength channels according to a sequence of the identifiers of the wavelength channels.

Correspondingly, the process of combining the data packets in the downstream frames of the wavelength channels according to the sequence identifiers of the data packets to obtain the received data includes: combining the data packets in the downstream frames having the same superframe number and the same ONU identifier on the wavelength channels according to the sequence identifiers of the data packets to obtain the received data.

Specifically, the ONU combines the received data packets in the downstream frames having the same superframe number and the same ONU identifier on different wavelength channels according to the channel identifiers. Still using the downstream frame structure shown in FIG. 4 as an example, ONU1 places data packet 1 transmitted to ONU1 on channel 1 at the front, places data packet 2 transmitted to ONU1 on channel 2 after data packet 1, places data packet 3 transmitted to ONU1 on channel 3 after data packet 2, and places data packet 4 transmitted to ONU1 on channel 4 after data packet 3. In this way, the recombination of data packets bound to the four channels is implemented. The ONU1 identifies, according to the ONU1 identifier, whether or not the data packet is a data packet transmitted to ONU1.

In this embodiment of the present disclosure, if the downstream frames of the four channels are completely synchronized, the ONU may resort and combine the simultaneously received data packets which are transmitted to the ONU using the four downstream frames and bound to the four downstream frames. It can be determined whether the bound data packets are transmitted to the ONU according to the same ONU identifier. If the downstream frames of the four channels cannot be fully synchronized, the ONU may associate, by using the superframe numbers of the four frames, the four downstream frames used for transmitting the bound data packets. The ONU combines the data packets in the downstream frames having the same superframe number and the same ONU identifier on different wavelength channels according to the channel identifier sequence. The packet combination sequence is not determined by time, thus avoiding a data disorder caused by delay jitter.

In an optional embodiment, the frame header of the downstream frame of each wavelength channel includes the sequence identifier of the data packet in the downstream frame of the wavelength channel.

Here, the sequence identifiers of the data packets can be determined according to the sequence identifiers in the frame headers of the downstream frames of the wavelength channels and then the data packets are combined according to the sequence identifiers of the data packets. In this way, the ONU obtains correct received data and the user experience is improved.

According to the data transmission and reception method provided in embodiments of the present disclosure, the wavelength channels for the data to be transmitted are determined according to the wavelength channel information received the ONU; the data to be transmitted is divided into data packets in a sequence according to the number of the wavelength channels with the number of the data packets is equal to the number of the wavelength channels; the data packets are identified and the sequence identifiers of the data packets are obtained; the data packets are encapsulated in the downstream frames of the wavelength channels in a one-to-one correspondence according to the sequence identifiers of the data packets, and the downstream frames of the wavelength channels are transmitted to the ONU separately. In this way, the data packets are encapsulated in the downstream frames of the wavelength channels in one-to-one correspondence according to the sequence identifiers. That is, when the OLT encapsulates each data packet, the sequence identifier of the data packet is carried. Therefore, after receiving the data packets, the ONU can combine the data packets according to the sequence identifiers of the data packets, such that the data reception disorder at the ONU is avoided when the OLT transmits data on multiple channels, thus improving user experience.

The data transmission and reception method described above will be described below on each device side in the PON system.

First, the data transmission method is described on the OLT side.

Figure 6:
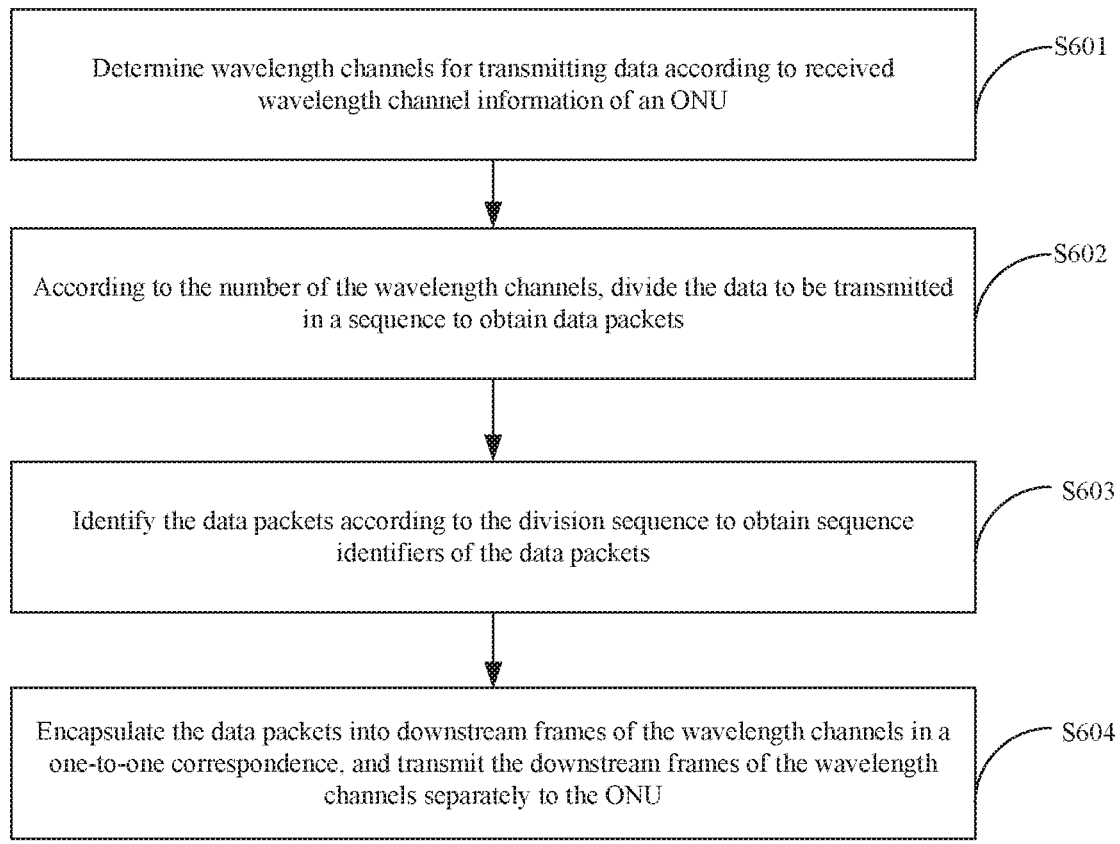
FIG. 6 is a flowchart of a data transmission method according to an embodiment of the present disclosure.

FIG. 6 is a flowchart of a data transmission method according to an embodiment of the present disclosure. As shown in FIG. 6, the method includes the steps described below.

In step S601, wavelength channels for data to be transmitted are determined according to received wavelength channel information of an ONU.

In step S602, the data to be transmitted is divided into data packets in a sequence according to the number of the wavelength channels.

In step S603, the data packets are identified in the division sequence and sequence identifiers of the data packets are obtained.

In step S604, the data packets are encapsulated into the downstream frames of the wavelength channels in a one-to-one correspondence according to the sequence identifiers of the data packets, and the downstream frames of the wavelength channels are transmitted separately to the ONU.

To encapsulate the data packets into the downstream frames of the wavelength channels in the one-to-one correspondence for enabling the ONU to combine the data packets in a correct sequence after the ONU receives the downstream frames, in an optional embodiment, the step S604 of encapsulating the data packets into the downstream frames of the wavelength channels in the one-to-one correspondence according to the sequence identifiers of the data packets may include: determining each data packet's corresponding wavelength channel identifier according to the sequence identifier of the data packet; and encapsulating each data packet into the downstream frame of the wavelength channel corresponding to the wavelength channel identifier. The downstream frames in which the data packets are encapsulated have a same superframe number so that the ONU is capable of combining the data packets in the downstream frames having the same superframe number and a same ONU identifier on the wavelength channels.

If the downstream frames of the wavelength channels have no superframe number, in an optional embodiment, before determining the wavelength channel identifiers corresponding to the data packets according to the sequence identifiers of the data packets, the method further include: inserting a superframe number in the downstream frames of the wavelength channels.

In an optional embodiment, the process in S604 of encapsulating the data packets into the downstream frames of the wavelength channels in the one-to-one correspondence according to the sequence identifiers of the data packets may include: writing the sequence identifiers of the data packets into frame headers of the downstream frames of the wavelength channels corresponding to the data packets.

To determine the wavelength channels for the data to be transmitted, in an optional embodiment, the step S601 may include: receiving the wavelength channel information of the ONU; determining, from the wavelength channel information, information about wavelength channels that are allowed to operate and transmitting the information about the wavelength channels that are allowed to operate to the ONU so that the ONU enables optical modules corresponding to the information about the wavelength channels that are allowed to operate and returns wavelength channel information corresponding to the enabled optical modules; and determining the wavelength channels for the data to be transmitted according to the wavelength channel information corresponding to the enabled optical modules.

Then, the data transmission method is described on the ONU side.

Figure 7:
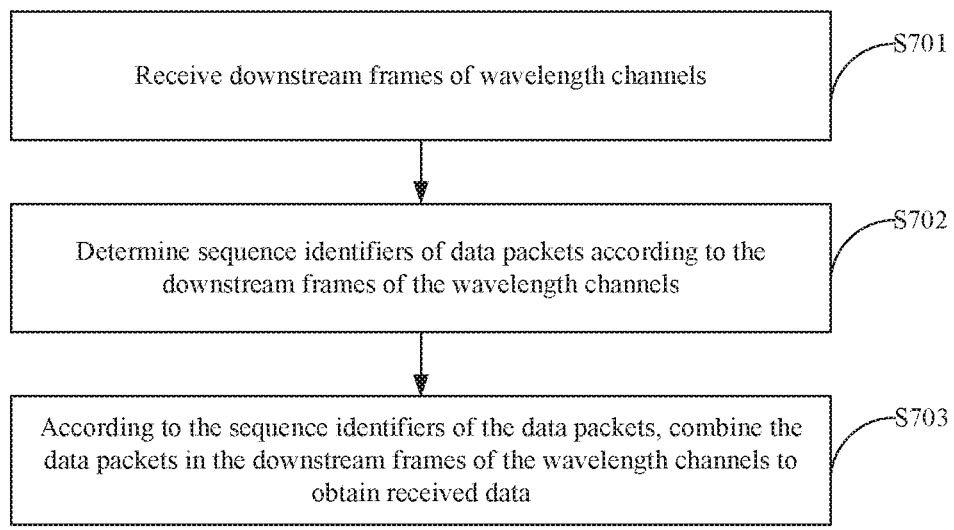
FIG. 7 is a flowchart of a data reception method according to an embodiment of the present disclosure.

FIG. 7 is a flowchart of a data reception method according to an embodiment of the present disclosure. As shown in FIG. 7, the method includes the steps described below.

In step S701, downstream frames of wavelength channels are received.

In step S702, sequence identifiers of data packets are determined according to the downstream frames of the wavelength channels.

In step S703, the data packets in the downstream frames of the wavelength channels are combined according to the sequence identifiers of the data packets to obtain received data.

To determine the sequence identifiers of the data packets for the correct data packet combination, in an optional embodiment, the step S702 may include: determining the sequence identifiers of the data packets in the downstream frames of wavelength channels according to a sequence of identifiers of the wavelength channels.

Correspondingly, the step S703 may include: combining the data packets in the downstream frames having a same superframe number and a same ONU identifier on the wavelength channels according to the sequence identifiers of the data packets to obtain the received data.

In an optional embodiment, a frame header of the downstream frame of each wavelength channel includes the sequence identifier of the data packet in the downstream frame of the wavelength channel.

To determine the wavelength channels for transmitting data, in an optional embodiment, before step S701, the method may further include: transmitting wavelength channel information of an ONU to an OLT so that OLT determines information about wavelength channels that are allowed to operate; receiving the information about the wavelength channels that are allowed to operate returned by the OLT; and enabling optical modules corresponding to the information about the wavelength channels that are allowed to operate, determining wavelength channel information corresponding to the enabled optical modules, and transmitting the wavelength channel information corresponding to the enabled optical modules to the OLT so that the OLT determines the wavelength channels for data transmission according to the wavelength channel information corresponding to the enabled optical modules.

Based on the same inventive concept, an embodiment of the present disclosure provides a data transmission device which is consistent with the OLT in one or more embodiments described above.

Figure 8:
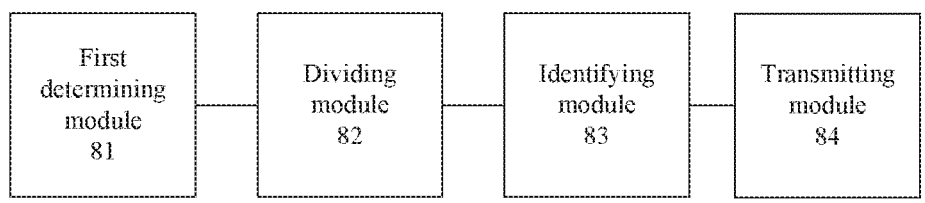
FIG. 8 is a structure diagram of a data transmission device according to an embodiment of the present disclosure.

FIG. 8 is a structure diagram of a data transmission device according to an embodiment of the present disclosure. As shown in FIG. 8, the device includes a first determining module 81, a dividing module 82, an identifying module 83 and a transmitting module 84.

The first determining module 81 is configured to determine wavelength channels for data to be transmitted according to received wavelength channel information of an optical network unit (ONU). The dividing module 82 is configured to divide the data to be transmitted in a sequence according to the number of the wavelength channels to obtain data packets. The identifying module 83 is configured to identify the data packets according to the division sequence to obtain sequence identifiers of the data packets. The transmitting module 84 is configured to encapsulate the data packets into downstream frames of the wavelength channels in a one-to-one correspondence according to the sequence identifiers of the data packets, and configured to transmit the downstream frames of the wavelength channels separately to the ONU.

In an optional embodiment, the transmitting module 84 is specifically configured to determine wavelength channel identifiers corresponding to the data packets according to the sequence identifiers of the data packets; and to encapsulate the each data packet into the downstream frame of the wavelength channel corresponding to the wavelength channel identifier. The downstream frames in which the data packets are encapsulated have a same superframe number so that the ONU can combine the data packets in the downstream frames having the same superframe number and a same ONU identifier on the wavelength channels.

In an optional embodiment, the device further includes an inserting module, which is configured to, before the wavelength channel identifiers corresponding to the data packets are determined according to the sequence identifiers of the data packets, insert a superframe number in the downstream frames of the wavelength channels if the downstream frames of the wavelength channels have no superframe number.

In an optional embodiment, the transmitting module 84 is specifically configured to write the sequence identifier of each data packet into a frame header of the downstream frame of the wavelength channel corresponding to the data packet.

In an optional embodiment, the first determining module 81 is specifically configured to: receive the wavelength channel information of the ONU; determine, from the wavelength channel information, information about wavelength channels that are allowed to operate and transmit the information about the wavelength channels that are allowed to operate to the ONU so that the ONU enables optical modules corresponding to the information about the wavelength channels that are allowed to operate and returns wavelength channel information corresponding to the enabled optical modules; and to determine the wavelength channels for the data to be transmitted according to the wavelength channel information corresponding to the enabled optical modules.

In practical use, the first determining module 81, the dividing module 82, the identifying module 83, the transmitting module 84 and the inserting module may all be implemented by a Central Processing Unit (CPU), a Microprocessor Unit (MPU), an Application Specific Integrated Circuit (ASIC), a Field-Programmable Gate Array (FPGA) or the like in the OLT.

Based on the same inventive concept, an embodiment of the present disclosure provides a data reception device which is consistent with the ONU in one or more embodiments described above.

Figure 9:
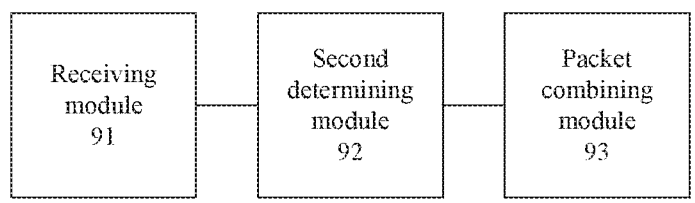
FIG. 9 is a structure diagram of a data receiving device according to an embodiment of the present disclosure.

FIG. 9 is a structure diagram of a data reception device according to an embodiment of the present disclosure. As shown in FIG. 9, the device includes a receiving module 91, a second determining module 92 and a packet combining module 93.

The receiving module 91 is configured to receive downstream frames over wavelength channels. The second determining module 92 is configured to determine sequence identifiers of data packets according to the downstream frames of the wavelength channels. The packet combining module 93 is configured to combine the data packets in the downstream frames of the wavelength channels according to the sequence identifiers of the data packets to obtain received data.

In an optional embodiment, the second determining module 92 is specifically configured to determine the sequence identifiers of the data packets in the downstream frames of the wavelength channels according to a sequence of identifiers of the wavelength channels; and correspondingly, the packet combining module 93 is specifically configured to combine the data packets in the downstream frames having a same superframe number and a same ONU identifier on the wavelength channels according to the sequence identifiers of the data packets to obtain the received data.

In an optional embodiment, the frame header of the downstream frame of each wavelength channel includes the sequence identifier of the data packet in the downstream frame of the wavelength channel.

In an optional embodiment, the device further includes a processing module. The processing module is configured to, before the downstream frames of the wavelength channels are received, transmit wavelength channel information of the ONU to an OLT so that OLT determines information about wavelength channels that are allowed to operate. The processing module is configured to receive the information about the wavelength channels that are allowed to operate returned by the OLT; enable optical modules corresponding to the information about the wavelength channels that are allowed to operate; determine wavelength channel information corresponding to the enabled optical modules; and transmit the wavelength channel information corresponding to the enabled optical modules to the OLT so that the OLT determines the wavelength channels for the data to be transmitted according to the wavelength channel information corresponding to the enabled optical modules.

In practical use, the receiving module 91, the second determining module 92, the packet combining module 93 and the processing module may be implemented by a CPU, an MPU, an ASIC, an FPGA or the like in the ONU.

A computer-readable medium is provided in this embodiment. The computer-readable medium may be a ROM (for example, a read-only memory, a FLASH memory or a transfer device), a magnetic storage medium (for example, a magnetic tape or a disk drive), an optical storage medium (for example, a CD-ROM, a DVD-ROM, a paper card or a paper tape) or another well-known type of program memory. The computer-readable medium stores computer-executable instructions. When the instructions are executed, at least one processor performs the operations described below.

Wavelength channels for data to be transmitted are determined according to received wavelength channel information of an optical network unit (ONU). The data to be transmitted is divided in a sequence according to the number of the wavelength channels so that data packets are obtained. The data packets are identified according to the division sequence to obtain sequence identifiers of the data packets. The data packets are encapsulated into downstream frames of the wavelength channels in a one-to-one correspondence according to the sequence identifiers of the data packets, and the downstream frames of the wavelength channels are transmitted separately to the ONU.

According to the data transmission and reception method provided in embodiments of the present disclosure, the wavelength channels for the data to be transmitted are determined according to the wavelength channel information received from the ONU; the data to be transmitted is divided in a sequence according to the number of the wavelength channels so that data packets whose quantity is the same as the quantity of the wavelength channels are obtained; the data packets are identified to obtain sequence identifiers of the data packets; and the data packets are encapsulated into downstream frames of the wavelength channels in a one-to-one correspondence according to the sequence identifiers of the data packets, and the downstream frames of the wavelength channels are transmitted to the ONU separately. In this way, each of the data packets is encapsulated into a respective one of the downstream frames of the wavelength channels according to its sequence identifier. That is, the sequence identifier of each data packet is also encapsulated when the OLT encapsulates the data packets. Therefore, after receiving the data packets, the ONU can combine the data packets according to the sequence identifiers of the data packets, thereby enabling the OLT to transmit data on a plurality of channels while avoiding a disorder of data received by the ONU, thus improving user experience.

Here, it is to be noted that the preceding device embodiments are described in a similar manner to the preceding method embodiments and have the same beneficial effects as the preceding method embodiments, and thus the beneficial effects of the device embodiments are not described again. Details not disclosed in the device embodiments of the present apparatus should be understood by those skilled in the art with reference to the description of the method embodiments of the present disclosure, and will not be repeated for the sake of a short length of the present application.

It is to be noted that:

It is to be understood that "one embodiment" or "an embodiment" as mentioned throughout the specification means that particular embodiment-related characteristics, structures or features are included in at least one embodiment of the present disclosure. Thus, "in an embodiment" or "in one embodiment" present throughout the specification does not necessarily refer to the same embodiment. Furthermore, these particular characteristics, structures or features may be combined in one or more embodiments in any suitable manner. It is to be understood that in various embodiments of the present disclosure, the serial numbers of the processes described above do not mean the sequence of execution; the sequence of execution of the processes should be determined by functions and internal logic of the processes, and should not be construed as any limitation to the implementation processes of embodiments of the present disclosure. The serial numbers of embodiments of the present disclosure are merely for the purpose of description and do not represent the superiority and inferiority of the embodiments.

It is to be noted that the term "comprising", "including" or any other variant thereof is intended to encompass a non-exclusive inclusion so that a process, method, article or apparatus that includes a series of elements not only includes the expressly listed elements but may also include other elements that are not expressly listed or are inherent to such process, method, article or apparatus. In the absence of more restrictions, the elements defined by the statement "including a . . . " do not exclude the presence of additional identical elements in the process, method, article or apparatus that includes the elements.

It is to be understood that the apparatuses and the methods disclosed in embodiments of the present disclosure may be implemented in other ways. The apparatus embodiments described above are merely illustrative. For example, the unit division is merely logical function division, and, in practice, the unit division may be implemented in other ways. For example, multiple units or components may be combined or may be integrated into another system, or some features may be omitted or not executed. Additionally, coupling, direct coupling or communicative connection between the presented or discussed components may be indirect coupling or communicative connection between devices or units via interfaces, or may be electrical, mechanical or in other forms.

The units described above as separate components may or may not be physically separated. Components presented as units may or may not be physical units, i.e., may be located in one place or may be distributed over multiple network units. Part or all of these units may be selected according to actual requirements to achieve objects of solutions of embodiments of the present disclosure.

Moreover, various function units in embodiments of the present disclosure may all be integrated in one processing unit, or each unit may be used as a separate unit, or two or more units may be integrated into one unit. The integrated function unit may be implemented by hardware or may be implemented by hardware plus a software function unit.

It can be understood by those skilled in the art that all or part of the steps in the method embodiments described above may be implemented by hardware related to program instructions, these programs may be stored in a computer-readable storage medium, and, when these programs are executed, steps including the method embodiments described above are executed; and the preceding storage medium includes various media capable of storing program codes, such as a removable storage device, a read-only memory (ROM), a magnetic disk or an optical disk.

Alternatively, the above-mentioned integrated unit of the present disclosure may also be stored in a computer-readable storage medium if implemented in the form of a software function module and sold or used as an independent product. Based on this understanding, solutions provided by embodiments of the present disclosure substantially, or the part contributing to the related art, may be embodied in the form of a software product. The software product is stored on a storage medium and includes several instructions for enabling a computer device (which may be a personal computer, a server or a network device) to execute all or part of the methods provided by embodiments of the present disclosure. The preceding storage medium includes various media capable of storing program codes, such as a removable storage device, a ROM, a magnetic disk or an optical disk.

The preceding are only embodiments of the present disclosure and are not intended to limit the present disclosure. It is easy for those skilled in the art to conceive modifications or substitutions within the scope of the present disclosure. These modifications or substitutions are within the scope of the present disclosure. Accordingly, the scope of the present disclosure should be subject to the scope of the claims.

INDUSTRIAL APPLICABILITY

As described above, the data transmission method and device and the data reception method and device provided in embodiments of the present disclosure have the following beneficial effects. The data packets are encapsulated into the downstream frames of the wavelength channels in a one-to-one correspondence according to the sequence identifiers. That is, when the OLT encapsulates the data packets, the sequence identifiers of the data packets are carried. Therefore, after receiving the data packets, the ONU can combine the data packets according to the sequence identifiers of the data packets. Therefore, when the OLT transmits data on multiple channels, the received data disorder is avoided at the ONU, thus improving user experience.

What is claimed is:

1. A data transmission method, comprising:
    determining wavelength channels for data to be transmitted according to received wavelength channel information of an optical network unit (ONU);
    dividing the data to be transmitted in a sequence according to a number of the wavelength channels to obtain data packets;
    identifying the data packets according to the division sequence to obtain sequence identifiers of the data packets; and
    encapsulating, according to the sequence identifiers of the data packets, the data packets into downstream frames of the wavelength channels in a one-to-one correspondence, and transmitting the downstream frames of the wavelength channels separately to the ONU.

2. The method of claim 1, wherein encapsulating, according to the sequence identifiers of the data packets, the data packets into downstream frames of the wavelength channels in a one-to-one correspondence comprises:
    determining wavelength channel identifiers corresponding to the data packets according to the sequence identifiers of the data packets; and
    encapsulating each of the data packets into the downstream frame of the wavelength channel corresponding to the wavelength channel identifier,
    wherein the downstream frames in which the data packets are encapsulated have a same superframe number so that the ONU combines the data packets in the downstream frames having the same superframe number and a same ONU identifier of the wavelength channels.

3. The method of claim 2, wherein before determining the wavelength channel identifiers corresponding to the data packets according to the sequence identifiers of the data packets, the method further comprises:
    inserting a superframe number in the downstream frame of each of the wavelength channels if the downstream frame of each of the wavelength channels has no superframe number.

4. The method of claim 1, wherein encapsulating, according to the sequence identifiers of the data packets, the data packets into downstream frames of the wavelength channels in a one-to-one correspondence comprises:
    writing the sequence identifier of each of the data packets into a frame header of the downstream frame of the wavelength channel corresponding to the data packet.

5. The method of claim 1, wherein before determining the wavelength channel for the data to be transmitted according to the received wavelength channel information of the ONU, the method further comprises:
    receiving the wavelength channel information of the ONU;
    determining, from the wavelength channel information, information about wavelength channels that are allowed to operate and transmitting the information about the wavelength channels that are allowed to operate to the ONU so that the ONU enables optical modules corresponding to the information about the wavelength channels that are allowed to operate and returns wavelength channel information corresponding to the enabled optical modules; and
    determining the wavelength channel for the data to be transmitted according to the wavelength channel information corresponding to the enabled optical modules.

6. A data receiving method, comprising:
    receiving downstream frames of wavelength channels;
    determining sequence identifiers of data packets according to the downstream frames of the wavelength channels; and
    combining, according to the sequence identifiers of the data packets, the data packets in the downstream frames of the wavelength channels to obtain received data;
    where determining the sequence identifiers of the data packets according to the downstream frames of the wavelength channels comprises:
    determining the sequence identifiers of the data packets in the downstream frames of the wavelength channels according to a sequence of the identifiers of the wavelength channels; and
    correspondingly, combining, according to the sequence identifiers of the data packets, the data packets in the downstream frames of the wavelength channels to obtain received data comprises:
    combining, according to the sequence identifiers of the data packets, the data packets in the downstream frames having a same superframe number and a same ONU identifier on the wavelength channels to obtain the received data.

7. The method of claim 6, wherein a frame header of the downstream frame of each of the wavelength channels comprises the sequence identifier of the data packet in the downstream frame of the wavelength channel.

8. The method of claim 6, wherein before receiving the downstream frames of the wavelength channels, the method further comprises:
    transmitting wavelength channel information of an optical network unit (ONU) to an optical line terminal (OLT) so that OLT determines information about wavelength channels that are allowed to operate;
    receiving the information about the wavelength channels that are allowed to operate returned by the OLT; and
    enabling optical modules corresponding to the information about the wavelength channels that are allowed to operate, determining wavelength channel information corresponding to the enabled optical modules, and transmitting the wavelength channel information corresponding to the enabled optical modules to the OLT so that the OLT determines the wavelength channels for data to be transmitted according to the wavelength channel information corresponding to the enabled optical modules.

9. An optical network unit (ONU), comprising:
a processor; and
a memory communicably connected to the processor and for storing instructions executable by the processor,
wherein execution of the instructions by the processor causes the processor to perform the data receiving method according to claim 6.

10. The ONU of claim 9, wherein a frame header of the downstream frame of each of the wavelength channels comprises the sequence identifier of the data packet in the downstream frame of the wavelength channel.

11. The ONU of claim 9, wherein before receiving the downstream frames of the wavelength channels, the method further comprises:
transmitting wavelength channel information of the ONU to an optical line terminal (OLT) so that OLT determines information about wavelength channels that are allowed to operate;
receiving the information about the wavelength channels that are allowed to operate returned by the OLT; and
enabling optical modules corresponding to the information about the wavelength channels that are allowed to operate, determining wavelength channel information corresponding to the enabled optical modules, and transmitting the wavelength channel information corresponding to the enabled optical modules to the OLT so that the OLT determines the wavelength channels for data to be transmitted according to the wavelength channel information corresponding to the enabled optical modules.

12. An optical line terminal (OLT), comprising:
a processor; and
a memory communicably connected to the processor and for storing instructions executable by the processor,
wherein execution of the instructions by the processor causes the processor to perform a data transmission method,
wherein the data transmission method comprises:
determining wavelength channels for data to be transmitted according to received wavelength channel information of an optical network unit (ONU);
dividing the data to be transmitted in a sequence according to a number of the wavelength channels to obtain data packets;
identifying the data packets according to the division sequence to obtain sequence identifiers of the data packets; and
encapsulating, according to the sequence identifiers of the data packets, the data packets into downstream frames of the wavelength channels in a one-to-one correspondence, and transmitting the downstream frames of the wavelength channels separately to the ONU.

13. The OLT of claim 12, wherein encapsulating, according to the sequence identifiers of the data packets, the data packets into downstream frames of the wavelength channels in a one-to-one correspondence comprises:
determining wavelength channel identifiers corresponding to the data packets according to the sequence identifiers of the data packets; and
encapsulating each of the data packets into the downstream frame of the wavelength channel corresponding to the wavelength channel identifier,
wherein the downstream frames in which the data packets are encapsulated have a same superframe number so that the ONU combines the data packets in the downstream frames having the same superframe number and a same ONU identifier of the wavelength channels.

14. The OLT of claim 13, wherein before determining the wavelength channel identifiers corresponding to the data packets according to the sequence identifiers of the data packets, the method further comprises: inserting a superframe number in the downstream frame of each of the wavelength channels if the downstream frame of each of the wavelength channels has no superframe number.

15. The OLT of claim 12, wherein encapsulating, according to the sequence identifiers of the data packets, the data packets into downstream frames of the wavelength channels in a one-to-one correspondence comprises: writing the sequence identifier of each of the data packets into a frame header of the downstream frame of the wavelength channel corresponding to the data packet.

16. The OLT of claim 12, wherein before determining the wavelength channel for the data to be transmitted according to the received wavelength channel information of the ONU, the method further comprises:
receiving the wavelength channel information of the ONU;
determining, from the wavelength channel information, information about wavelength channels that are allowed to operate and transmitting the information about the wavelength channels that are allowed to operate to the ONU so that the ONU enables optical modules corresponding to the information about the wavelength channels that are allowed to operate and returns wavelength channel information corresponding to the enabled optical modules; and
determining the wavelength channel for the data to be transmitted according to the wavelength channel information corresponding to the enabled optical modules.

* * * * *